Patented Jan. 29, 1952

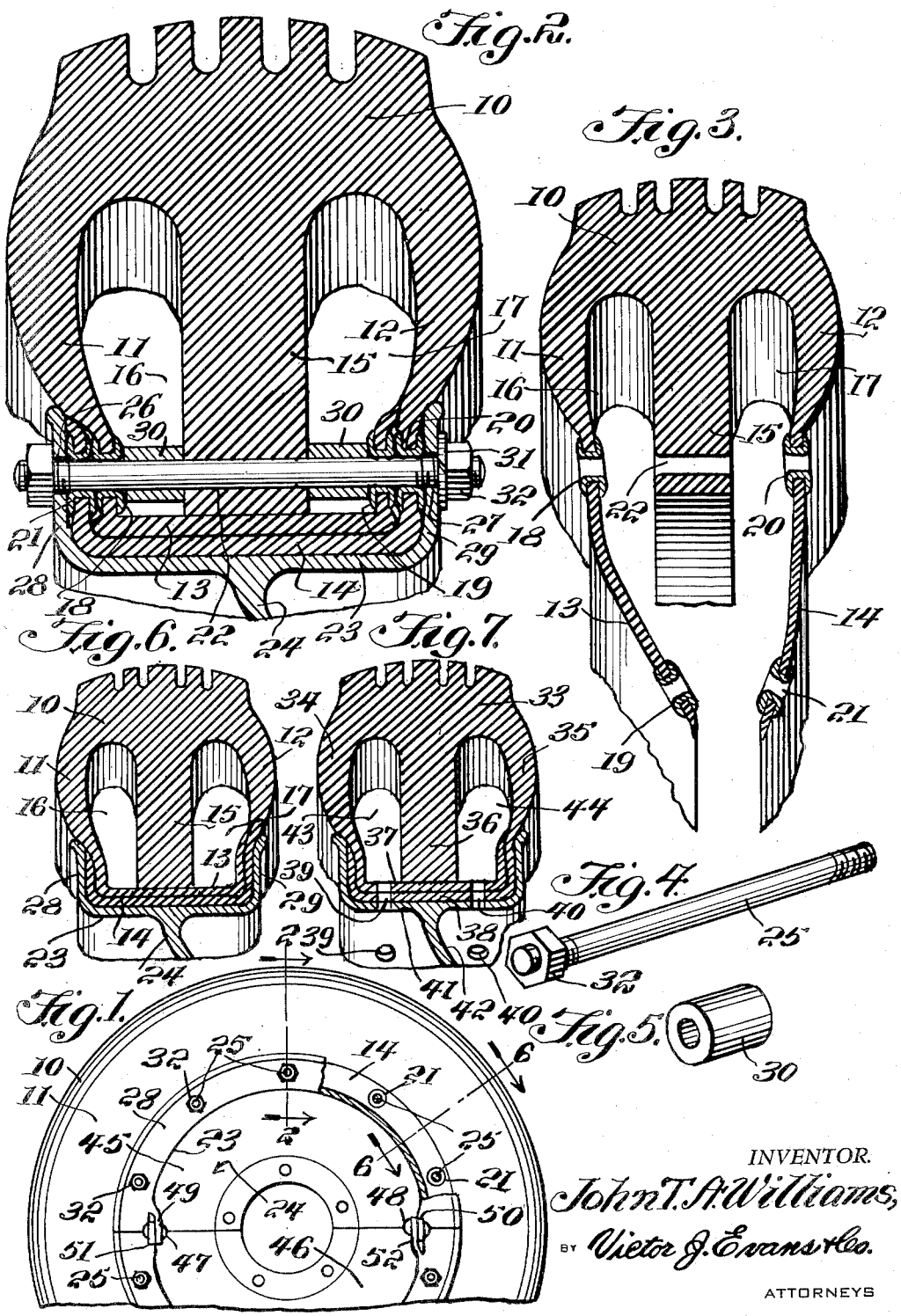

2,584,073

UNITED STATES PATENT OFFICE 2,584,073

RESILIENT MOTOR VEHICLE TIRE

John T. A. Williams, New Orleans, La.

Application June 20, 1950, Serial No. 169,197

7 Claims. (Cl. 152—379)

This invention relates to motor vehicle tires of the solid type wherein inner tubes are eliminated so that they are puncture proof, and in particular a tire having a substantially solid outer section with side walls having extended flaps on the inner edges and in which a comparatively thick center web is provided which takes the load, and provides resiliency.

The purpose of this invention is to provide an improved tire of the solid type in which inner tubes are eliminated and which is demountable so that it may readily be removed from and installed upon a split rim.

Various types of solid tires have been provided in which air cells and cushions of different forms have been used but it has been found difficult to arrange the open areas to provide resiliency comparable to that of pneumatic tires particularly in a solid tire of the demountable type. With this thought in mind this invention contemplates a tire of the solid type having continuous annular open areas on the sides of a thick center web with side walls having extended flaps through which the tire is bolted on the rim of a wheel.

The object of this invention is, therefore, to provide means for forming a solid tire particularly adapted for motor vehicle wheels wherein open areas in the body of the tire are positioned to provide resiliency and wherein the tire is demountable.

Another object of the invention is to provide means for attaching a demountable solid tire on the rim of a wheel whereby the tire is not accidentally removable.

A further object of the invention is to provide a motor vehicle tire of the solid type which is of a simple and economical construction.

With these and other objects and advantages in view the invention embodies a motor vehicle tire having a solid outer section with arcuate side walls, with a comparatively thick center web and with extended overlapping flaps with eyelets therethrough extended from the inner edges of the side walls.

Other features and advantages of the invention will appear from the following description taken in connection with the drawings wherein:

Figure 1 is an elevational view showing the upper part of the rim of a wheel with the improved tire mounted thereon and with parts broken away and parts shown in section.

Figure 2 is a cross section through the tire shown in Figure 1 taken on line 2—2 thereof.

Figure 3 is a typical section through the improved solid tire showing the flaps at the edges of the side walls extended.

Figure 4 is a detail illustrating a bolt for mounting the tire on the rim of a wheel.

Figure 5 is a detail illustrating spacing sleeves positioned on the bolt and located on the sides of the center web.

Figure 6 is a cross section through the tire and rim taken on line 6—6 of Figure 1.

Figure 7 is a similar section showing a modification wherein openings are extended through flaps and rims that provide communicating means between areas within the tire and the atmosphere.

Referring now to the drawings wherein like reference characters denote corresponding parts the improved solid tire of this invention is formed with an outer solid section 10, side walls 11 and 12 having flaps 13 and 14, respectively, extended therefrom, and a center annular web 15.

The tire may be of any suitable shape or form and a tread of any type desired may be provided in or on the outer surface.

In the design shown the tire is provided with open annular inner areas 16 and 17 which provide cushioning means being filled, or partly filled with air and it will be understood that the shape of the walls around these areas may be formed to compensate for the type of tire or to correspond with the usage for which the tire is intended.

As illustrated in Figures 2 and 3 the flap 13 extended from the side wall 11 is provided with rows of eyelets 18 and 19 and the flap 14 is provided with corresponding rows as indicated by the numerals 20 and 21.

The center web 15 which extends continuously around the tire is provided with spaced transversely disposed openings 22 that are aligned with the eyelets 18 and 20 and with the tire in position on the rim 23 of a wheel having a web 24 the flap extended from one side wall overlaps the flap extended from the other wall so that the eyelets 19 register with the eyelets 20 and eyelets 21 register with the eyelets 18, as illustrated in Figure 2.

With the parts in the position as illustrated in Figure 2 bolts 25 are placed through the eyelets and openings 22 of the web 15 with the ends of the bolts positioned in registering openings 26 and 27 in flanges 28 and 29, respectively of the rim 23 of the wheel. With the parts in this position spacing sleeves 30, as illustrated in Figure 5 are positioned on the bolts between the center web 15 and the eyelets of the flaps of the side walls. Lock washers 31 may also be provided under nuts 32 on the ends of the bolts.

In the modification illustrated in Figure 7 a tire 33, provided with side walls 34 and 35 and a center web 36 and in which flaps 37 and 38 extend from the side walls is provided with openings, as indicated by the numerals 39 and 40 which extend through the flaps and also through a rim 41 of a wheel 42, the openings providing bleeders whereby air trapped in open areas 43 and 44 of the tire may pass back and forth to the atmosphere. It will be understood that the size and number of the openings may be changed to regulate the resiliency of the tire.

In the design shown the tire is mounted on a rim formed of two semi-circular sections 45 and 46 as illustrated in my prior Patent No. 2,251,310 of August 5, 1941. These sections are hinged by pins 47 and 48 that are positioned in extensions 49 and 50 of the section 45 and 51 and 52 of the section 46.

With the parts arranged in this manner the tire may readily be mounted upon and removed from the split rim of the wheel of my former patent and with the parts in position bolts are inserted through openings in the flanges of the rim, eyelets and openings of the center web. The tire is, therefore, positively secured or locked to the rim of the wheel and is held in operative position thereon. By this means the tire may readily be removed and replaced and may also be turned on the rim.

It will be understood that modifications may be made in the design and arrangement of the parts without departing from the spirit of the invention.

What is claimed is:

1. A vehicle tire comprising a solid outer section having tapering inwardly extended side walls with overlapping inwardly extended flaps extended inwardly from the said side walls, the flaps of each of said walls extended across the inner surface of the solid outer section of the tire and upwardly against the side wall on the opposite side of the tire, and an annular center web extended inwardly from the solid outer section and spaced from the side walls providing enclosed annular air cushions between the center web and side walls.

2. A vehicle tire comprising a solid outer section having tapering inwardly extended side walls with overlapping inwardly extended flaps extended from the said side walls, an annular center web extended inwardly from the solid outer section and spaced from the side walls providing enclosed annular air cushions between the center web and side walls, and spaced rows of spaced eyelets positioned in the extended flaps of the side walls and said center web having spaced openings therethrough aligned with one of the rows of eyelets in the said flaps.

3. A vehicle tire comprising a solid outer section having tapering inwardly extended side walls with overlapping inwardly extended flaps extended from the said side walls, an annular center web extended inwardly from the solid outer section and spaced from the side walls providing enclosed annular air cushions between the center web and side walls, said center web and flaps of the side walls having spaced bolt holes therein and said bolt holes of the parts being in registering relation with the flap of one side wall folded over the flap of the other side wall.

4. In a motor vehicle tire, the combination which comprises a split rim having side flanges with spaced openings through the flanges and a tire having a solid annular outer section with an inwardly extended annular center web and side walls spaced from the center web and having overlapping flaps with registering openings therethrough and with the openings positioned to register with openings in the flanges at the sides of the rim, said center web having corresponding openings therethrough, and bolts extended through the openings of the tire and flanges of the rim.

5. In a motor vehicle tire, the combination which comprises a split rim having side flanges with spaced bolt holes in the flanges, a tire having a solid annular outer section with an inwardly extended annular web positioned midway between the sides of the tire and having spaced bolt holes therethrough, said tire also having side walls with inwardly extended flaps and the said flaps of the side walls having spaced rows of spaced bolt holes therein with the said bolt holes of the flaps, annular web and flanges of the rim aligned with the flaps nested in the rim, and bolts extended through the said bolt holes.

6. In a motor vehicle tire, the combination which comprises a split rim having side flanges with spaced bolt holes in the flanges, a tire having a solid annular outer section with an inwardly extended annular web positioned midway between the sides of the tire and having spaced bolt holes therethrough, said tire also having side walls with inwardly extended flaps and the said flaps of the side walls having spaced rows of spaced bolt holes therein with the said bolt holes of the flaps, annular web and flanges of the rim aligned with the flaps nested in the rim, said flaps of the side walls and rim having air escape openings therethrough.

7. In a motor vehicle tire, the combination which comprises a split rim having side flanges with spaced bolt holes in the flanges, a tire having a solid annular outer section with an inwardly extended annular web positioned midway between the sides of the tire and having spaced bolt holes therethrough, said tire also having side walls with inwardly extended flaps and the said flaps of the side walls having spaced rows of spaced bolt holes therein with the said bolt holes of the flaps, annular web and flanges of the rim aligned with the flaps nested in the rim, eyelets positioned in the openings of the flaps.

JOHN T. A. WILLIAMS.

REFERENCES CITED

The following references are of record in the file of this patent:

UNITED STATES PATENTS

| Number | Name | Date |
|--------|------|------|
| 493,675 | Barrett | Mar. 21, 1893 |
| 640,174 | Berg et al. | Jan. 2, 1900 |
| 875,726 | McDowell | Jan. 7, 1908 |
| 998,668 | Barnes | July 25, 1911 |